(12) United States Patent
Katou et al.

(10) Patent No.: US 9,335,570 B2
(45) Date of Patent: May 10, 2016

(54) OPTICAL-WAVEGUIDE-ELEMENT MODULE

(71) Applicant: SUMITOMO OSAKA CEMENT CO., LTD., Chiyoda-ku, Tokyo (JP)

(72) Inventors: Kei Katou, Tokyo (JP); Norikazu Miyazaki, Tokyo (JP)

(73) Assignee: SUMITOMO OSAKA CEMENT CO., LTD., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/369,511

(22) PCT Filed: Dec. 28, 2012

(86) PCT No.: PCT/JP2012/084040
§ 371 (c)(1),
(2) Date: Jun. 27, 2014

(87) PCT Pub. No.: WO2013/100119
PCT Pub. Date: Jul. 4, 2013

(65) Prior Publication Data
US 2015/0063743 A1    Mar. 5, 2015

(30) Foreign Application Priority Data

Dec. 28, 2011 (JP) ................. 2011-287227

(51) Int. Cl.
*G02F 1/035* (2006.01)
*G02F 1/01* (2006.01)
(Continued)

(52) U.S. Cl.
CPC .............. *G02F 1/035* (2013.01); *G02F 1/0121* (2013.01); *G02F 1/225* (2013.01); *G02F 1/2255* (2013.01); *G02F 2001/212* (2013.01)

(58) Field of Classification Search
CPC ....... G02F 1/035; G02F 1/0121; G02F 1/225; G02F 1/2255
See application file for complete search history.

(56) References Cited

U.S. PATENT DOCUMENTS 6,192,167 B1 * 2/2001 Kissa .................... G02F 1/0356
385/14
7,751,656 B2 * 7/2010 Sugiyama ............. G02F 1/2255
359/251
(Continued)

FOREIGN PATENT DOCUMENTS

JP        2003-233044 A    8/2003
JP        3642762          2/2005
(Continued)

*Primary Examiner* — Sung Pak
(74) *Attorney, Agent, or Firm* — Taft Stettinius & Hollister LLP (57) ABSTRACT

An object of the present invention is to provide an optical waveguide element module where the bonding wires can be prevented from disengaging or disconnecting so as to provide high reliability. Another object is to provide an optical waveguide element module that can be made compact and where an increase in the manufacturing cost can be minimized. An optical waveguide element module having: a waveguide substrate 1 on which an optical waveguide (not shown) and control electrodes (E1 to E4) for controlling light waves that propagate through the optical waveguide are formed; external substrates (21 to 24) having wire circuits (TM1, C1), which are connected to control electrodes electrically, disposed proximity to the waveguide substrate; a housing 3 in which the external substrate and the waveguide substrate are arranged; and terminals (T21 to T24) which are connected to an external electric circuit (not shown) for supplying electrical signals to the control electrode or deriving electrical signals from the control electrode provided with the housing, wherein relay electrode pads (CP1, CP4) which are electrically isolated from both of the wiring circuit and the control electrode are formed in any portion of the waveguide substrate 1 and the external substrates (21 to 24), and at least one bonding wire (W21, W22, W41, W42) is connected from a control electrode to the terminal or from the wire circuit to the terminal via the relay electrode pad.

10 Claims, 8 Drawing Sheets

(51) Int. Cl.
*G02F 1/225* (2006.01)
*G02F 1/21* (2006.01)

(56) References Cited

U.S. PATENT DOCUMENTS

| | | | | |
|---|---|---|---|---|
| 8,411,349 B2* | 4/2013 | Mitomi | ................ | G02F 1/2255 359/237 |
| 2003/0151793 A1 | 8/2003 | Sugiyama et al. | | |
| 2010/0316326 A1* | 12/2010 | Sugiyama | ............... | G02F 1/225 385/3 |
| 2011/0019956 A1 | 1/2011 | Sugiyama | | |
| 2011/0268382 A1 | 11/2011 | Takemura et al. | | |

FOREIGN PATENT DOCUMENTS

| | | |
|---|---|---|
| JP | 2010-286770 | 12/2010 |
| JP | 2011-28014 | 2/2011 |
| JP | 2011-209456 | 10/2011 |

* cited by examiner

OPTICAL-WAVEGUIDE-ELEMENT MODULE

TECHNICAL FIELD

The present invention relates to an optical waveguide element module, and in particular to an optical waveguide element module that contains within its housing a waveguide substrate on which an optical waveguide and control electrodes for controlling light waves that propagate through the optical waveguide are formed and an external substrate having a wire circuit to be electrically connected to a control electrode.

BACKGROUND ART

In the optical measurement technical field and the optical communication technical field, optical waveguide element modules where an optical waveguide element, such as an optical modulator, is built in have been used. In most of the optical modules using a substrate having an electro-optical effect such as of lithium niobate, as shown in Patent Document 1, a bias voltage (DC voltage) for adjusting the modulation operating point relative to the high-frequency signal, which is a modulation signal, and the drive voltage is applied to the control electrodes (signal electrodes) of the optical waveguide element.

Figure 1A:
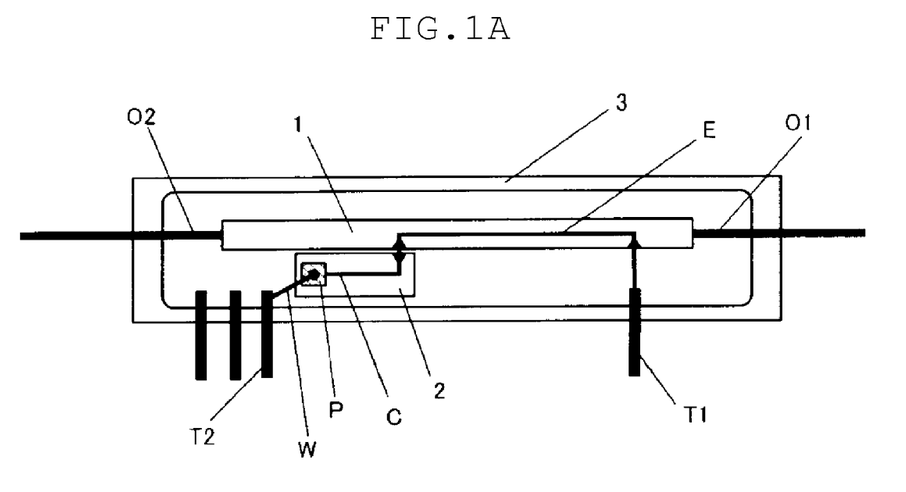
FIGS. 1(a) and 1(b) are schematic diagrams for illustrating the appearance of the inside of the housing of a conventional optical modulator.
Figure 1B:
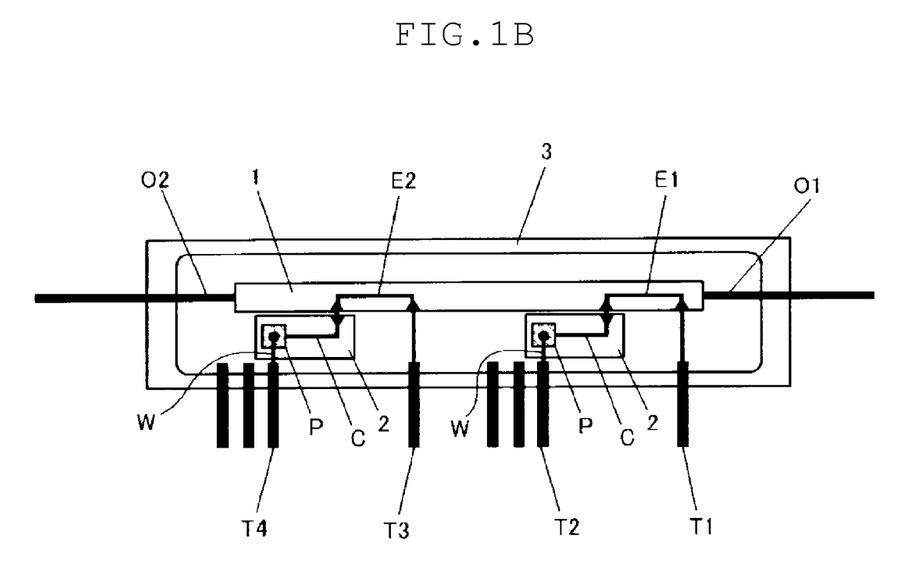

In a conventional optical modulator, as shown in FIGS. 1(a) and 1(b), a waveguide substrate 1 for forming an optical waveguide element has inside of it one modulation unit (see FIG. 1(a)) or a structure where two modulation units (see FIG. 1(b)) are connected in series, and thus, the number of external substrates 2, such as termination substrates, provided around the waveguide substrates and the number of connection terminals (T1 to T4) to be connected to an external electric circuit outside the module are small. In addition, enough space for providing the optical waveguide substrate 1 and the external substrates 2 is secured inside the housing 3, and furthermore, the layout of the connection terminals (T1 to T4), such as DC terminals, for outputting a signal to the outside can be relatively freely designed. Therefore, it is possible to easily design the layout so that the bonding wires W for connecting the waveguide substrate 1 to an external substrate 2 or an external substrate 2 to a connection terminal have an appropriate length with high reliability.

Multivalued modulation systems that correspond to a high speed, large capacity optical communication system have been used in recent years, and thus, the integration of modulation units has progressed and the number of parts used inside the housing has been increased. In addition, the locations to which input/output terminals for signals (RF connectors, DC terminals) are attached, the locations of screw holes for securing an optical modulator, and the maximum size of the optical modulators are standardized according to the international standards, and therefore, the locations to which parts are mounted inside the housing are more restricted than in the conventional compact modulators.

Therefore, the length of the bonding wires for the connection between a termination substrate and a connection terminal, such as a DC terminal for example, is longer than that of the conventional compact modulator, and in some places, it exceeds 10 mm.

In the impact/vibration test for electro-optical parts, it is stipulated that mechanical impacts are to be given in five directions under the conditions of 500 g and 1.0 ms five times per direction, and vibrations with 20 g, 20 to 2000 Hz, and intervals of 20 Hz are to be given under the conditions of four minutes per cycle and four cycles in one axial direction. When a bonding wire has a predetermined length or longer, it becomes easy to disengage or disconnect the bonding wire when vibrations or impacts are applied to the optical modulator. It is possible for the cause of this to be the lack of mechanical strength in the connection portion due to the increase of the weight of the bonding wire or an increase in the displacement of the wire due to the agreement of the length of the wire with the resonant frequency of the vibrations.

In order to prevent a bonding wire from disengaging or disconnecting, it is desirable to reduce the number of bonding wiring places or to make the bonding wires as short as possible. For example, it is possible to reduce the length of the bonding wires by placing the external substrates, such as termination substrates, close to the control electrodes or the connection terminals.

Figure 2:
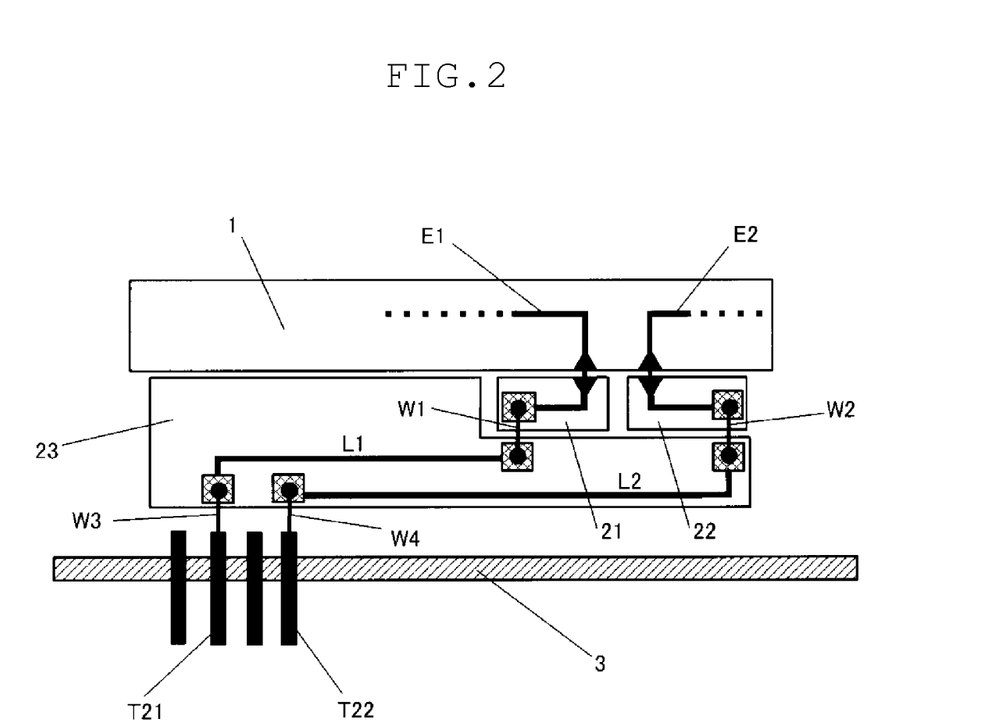
FIG. 2 is a diagram for illustrating the appearance where relay substrates are placed between a termination substrate and connection terminals.

Alternatively, as shown in FIG. 2, it is possible to provide a new substrate 23 for relay between a termination substrate (21, 22) and a DC terminal (T21, T22). However, such problems arise that the number of bonding wiring places increases, the cost increases due to an increase the number of parts, and the number of work steps increases due to the mounting of additional parts.

In addition, as shown in FIG. 2, it is necessary to increase the size of the relay substrate 23 so as to fill the space between the termination substrate (21, 22) and the DC terminal (T21, T22), and thus, it also becomes difficult to make the entirety of the module compact.

Furthermore, it is desirable to use an alumina thin film substrate for the external substrates in order to obtain good high-frequency properties. In the case where lithium niobate (LN) is used for the waveguide substrate of the optical waveguide element, for example, stainless steel (SUS) is often used for the housing. In this case, the difference in the coefficient of linear thermal expansion is great between the SUS (coefficient of linear thermal expansion: $18.7 \times 10^{-6}/°C$.) used for the housing of the modulator and the alumina (coefficient of linear thermal expansion: $7.2 \times 10^{-6}/°C$.), and therefore, in the case where a large alumina substrate, such as the relay substrate 23 in FIG. 2), is used, the alumina substrate cracks when the optical modulator is heated at a high temperature. In order to prevent this, it is necessary to provide an intermediary material such as 50 alloy (50 Ni—Fe alloy) or 52 alloy (52 Ni—Fe alloy) between the alumina substrate and the housing, which causes a further increase in the cost.

PRIOR ART DOCUMENT

Patent Document

Patent Document 1: Japanese Patent No. 3642762

SUMMARY OF THE INVENTION

Problem to be Solved by the Invention

An object of the present invention is to provide an optical waveguide element module that solves the above-described problems, and where the bonding wires can be prevented from disengaging or disconnecting so as to provide high reliability. Another object is to make it possible to provide an optical waveguide element module that can be made compact and where an increase in the manufacturing cost can be minimized.

Means for Solving Problem

In order to achieve the above-described objects, the invention according to a first aspect of the invention is an optical waveguide element module having: a waveguide substrate on which an optical waveguide and control electrodes for controlling light waves that propagate through the optical waveguide are formed; an external substrate having a wire circuit, which is connected to a control electrode electrically, disposed proximity to the waveguide substrate; a housing in which the external substrate and the waveguide substrate are arranged; and terminals which is connected to an external electrical circuit for supplying electrical signals to the control electrode or deriving electrical signals from the control electrode provided with the housing, wherein a relay electrode pad which is electrically isolated from both of the wiring circuit and the control electrode is formed in any portion of the waveguide substrate and the external substrates, and at least one bonding wire is connected from a control electrode to the terminal or from the wire circuit to the terminal via the relay electrode pad.

The invention according to a second aspect of the invention is the optical waveguide element module according to the first aspect of the invention, wherein the bonding wire via the relay electrode pad is a wire for supplying a low frequency signal or a DC signal to the control electrode.

The invention according to a third aspect of the invention is the optical waveguide element module according to the first or second aspects of the invention, wherein an external substrate is a relay substrate for supplying a high-frequency signal to a control electrode or a termination substrate for terminating a high-frequency signal derived from a control electrode.

The invention according to a fourth aspect of the invention is the optical waveguide element module according to any of the first through third aspects of the invention, wherein the optical waveguide is provided with at least two or more integrated Mach-Zehnder type optical waveguides.

The invention according to a fifth aspect of the invention is the optical waveguide element module according to the second aspect of the invention, wherein at least one of the external substrates is a termination substrate, a wire circuit of the termination substrate is provided with a circuit for supplying a low frequency signal for bias control or a DC signal of a bias voltage to the control electrode, and a wire for supplying the low frequency signal or the DC signal is a bonding wire connected via the relay electrode pad which provided on the waveguide substrate or on another external substrate.

Effects of the Invention

The invention according to the first aspect of the invention provides an optical waveguide element module having: a waveguide substrate on which an optical waveguide and control electrodes for controlling light waves that propagate through the optical waveguide are formed; an external substrate having a wire circuit, which is connected to a control electrode electrically, disposed proximity to the waveguide substrate; a housing in which the external substrate and the waveguide substrate are arranged, and terminals which is connected to an external electrical circuit for supplying electrical signals to the control electrode or deriving electrical signals from the control electrode provided with the housing, wherein a relay electrode pad which is electrically isolated from both of the wiring circuit and the control electrode is formed in any portion of the waveguide substrate and the external substrates, and at least one bonding wire is connected from a control electrode to the terminal or from the wire circuit to the terminal via the relay electrode pad, and therefore, a long bonding wire can be divided into two or more wires at a relay electrode pad, which makes it possible to shorten the length of one bonding wire. As a result, the bonding wire can be prevented from disengaging or disconnecting due to vibrations or an impact, and thus, it is possible to provide an optical waveguide element module with high reliability. In addition, the relay electrode pads are formed on the existing waveguide substrate or external substrates, and therefore, it is also possible to prevent increases in the size of the parts or in the number of parts, and an optical waveguide element module that can be reduced in size and where an increase in the manufacturing cost can be minimized can be provided.

In accordance with the invention according to the second aspect of the invention, the bonding wire via the relay electrode pad is a wire for supplying a low frequency signal or a DC signal to the control electrode, and therefore, various properties of the optical waveguide element do not deteriorate even in the case where the length of the wire via the relay electrode pad varies. In the case where a bonding wire for transmitting a high-frequency signal is disposed via a relay electrode pad, the length of the entire wire varies, which causes the phase in which a high-frequency signal is applied to a control electrode to change and makes it easy for the reflection of the signal from the connection portion of the relay electrode pad to take place, and this causes various properties of the optical waveguide element, such as the modulation properties of the optical modulator, to deteriorate.

In accordance with the invention according to the third aspect of the invention, an external substrate is a relay substrate for supplying a high-frequency signal to a control electrode or a termination substrate for terminating a high-frequency signal derived from a control electrode, and therefore, external substrates used for the existing optical waveguide element modules can be used, which makes it possible to provide an optical waveguide element module having high reliability without an increase in the number of parts.

In accordance with the invention according to the fourth aspect of the invention, the optical waveguide is provided with at least two or more integrated Mach-Zehnder type optical waveguides, and therefore, generally, the number of control electrodes for controlling the light waves that propagate through the optical waveguide increases, and in addition, the number of external substrates, such as termination substrates, increases. The structure as in the first aspect of the invention can be applied to such an optical waveguide element, and thus, it becomes possible to provide an optical waveguide element module having higher reliability.

In accordance with the invention according to the fifth aspect of the invention, at least one of the external substrates is a termination substrate, a wire circuit of the termination substrate is provided with a circuit for supplying a low frequency signal for bias control or a DC signal of a bias voltage to the control electrode, and a wire for supplying the low frequency signal or the DC signal is a bonding wire connected via the relay electrode pad which provided on the waveguide substrate or on another external substrate, and therefore, the length of the bonding wires for supplying a low frequency signal or a DC signal can always be set to a predetermined length or shorter, and thus, it becomes possible to provide an optical waveguide element module having high reliability.

PREFERRED EMBODIMENTS OF THE INVENTION

In the following, the optical waveguide element module according to a preferred embodiment of the present invention is described in detail.

Figure 3:
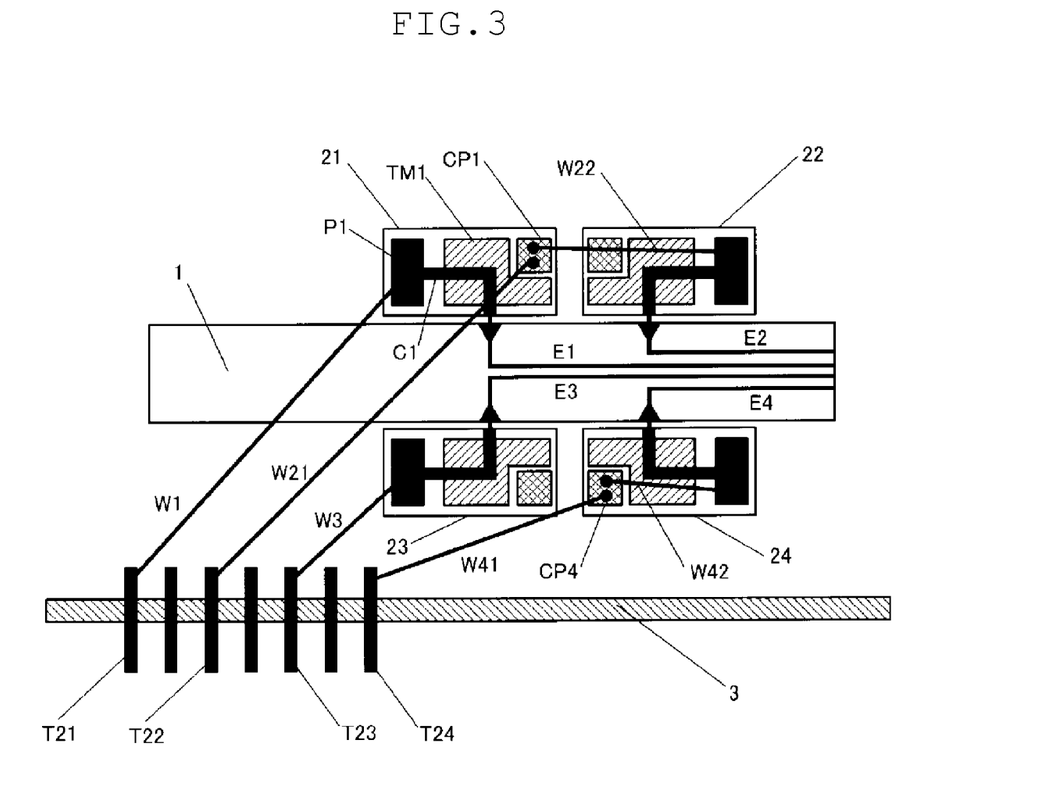
FIG. 3 is a schematic diagram for illustrating an optical waveguide element module according to the present invention.

As shown in FIG. 3, the optical waveguide element module according to the present invention is an optical waveguide element module having: a waveguide substrate 1 on which an optical waveguide (not shown) and control electrodes (E1 to E4) for controlling light waves that propagate through the optical waveguide are formed; external substrates (21 to 24) having wire circuits (TM1, C1), which are connected to control electrodes electrically, disposed proximity to the waveguide substrate; a housing 3 in which the external substrate and the waveguide substrate are arranged; and terminals (T21 to T24) which are connected to an external electric circuit (not shown) for supplying electrical signals to the control electrode or deriving electrical signals from the control electrode provided with the housing, wherein relay electrode pads (CP1, CP4) which that are electrically isolated from both of the wiring circuit and the control electrode are formed in any portion of the waveguide substrate 1 and the external substrates (21 to 24), and at least one bonding wire (W21, W22, W41, W42) is connected from a control electrode to the terminal or from the wire circuit to the terminal via the relay electrode pad.

Figure 4A:
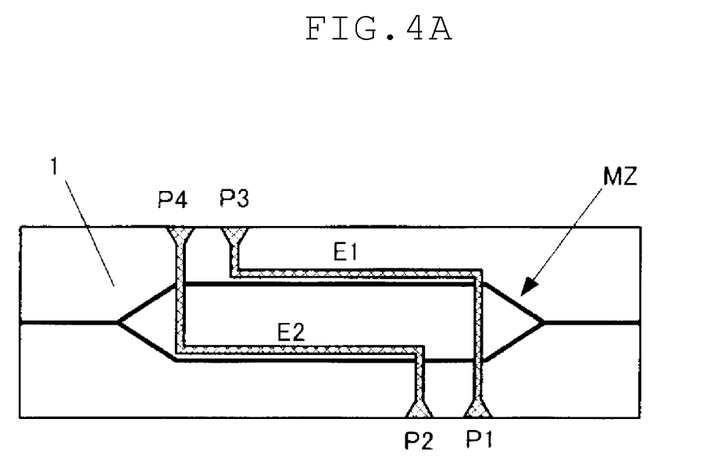
FIGS. 4(a) to 4(c) are diagrams for illustrating an example of the layout of an optical waveguide and control electrodes (signal electrodes) in each type of waveguide substrate.
Figure 4B:
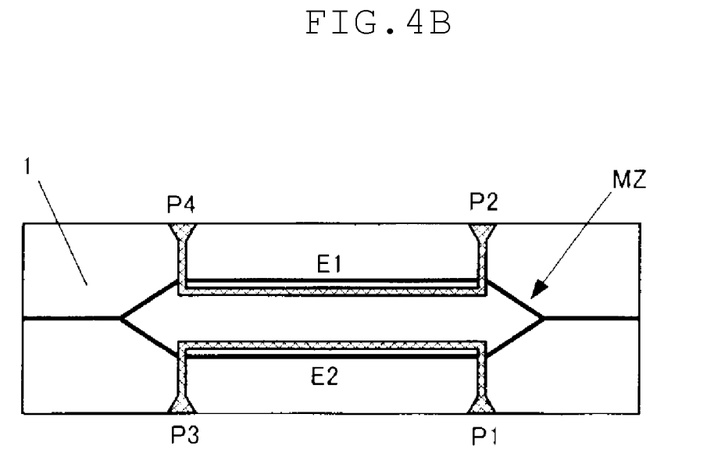
Figure 4C:
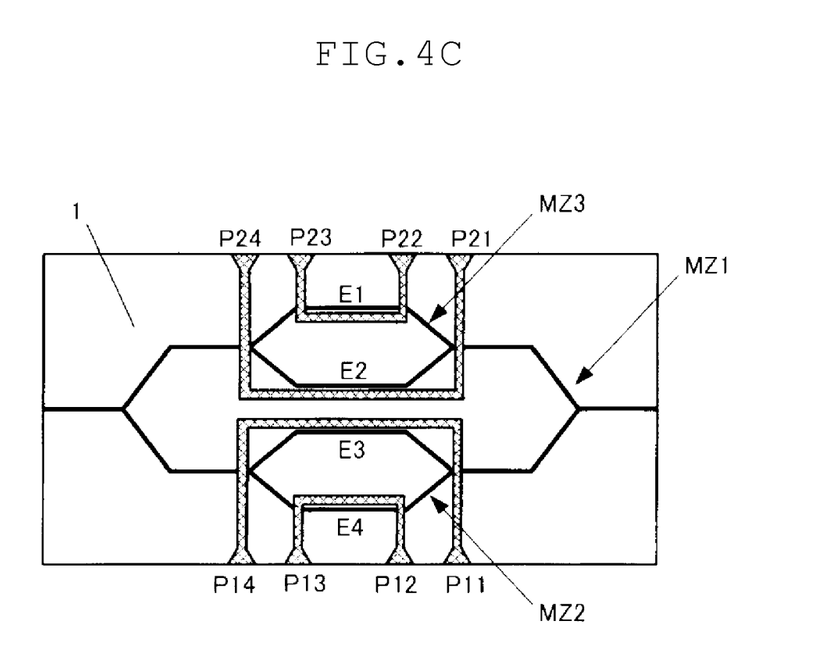

It is preferable for the optical waveguide element used in the present invention to be an optical waveguide element, such as an optical modulator, where an optical waveguide and control electrodes (formed of a signal electrode and a ground electrode) are formed on a substrate having an electro-optical effect, such as lithium niobate. There are various forms of the optical waveguide, and there are no particular limitations. As shown in FIGS. 4(a) to 4(c), however, in the cases where (a) input portions (P1, P2) and output portions (P3, P4) of the signal electrodes (E1, E2) are formed on the opposite sides of the waveguide substrate 1, (b) input/output portions (P1 and P3, P2 and P4) are placed on the different sides of the substrate for each signal electrode (E1, E2), and (c) a number of signal electrodes (E1 to E4) are placed on the two sides of the substrate 1, bonding wires tend to be longer, and therefore, the present invention is applicable and appropriate.

In addition, as shown in FIGS. 4(a) to 4(c), it is necessary to optimally control the operating point when a drive signal is applied to a signal electrode in an optical waveguide made up of a Mach-Zehnder type optical waveguide (MZ, MZ1 to MZ3). Therefore, as shown in Patent Document 1, a DC bias voltage is applied to the signal electrodes separately from the drive signal, such as a high-frequency signal. In some cases, a low frequency signal for optimally controlling the DC bias voltage is applied so as to superpose the DC bias voltage.

As in Patent Document 1 or as shown in FIG. 3, termination substrates (21 to 24) having an electric circuit (TM1) including a termination resistor for the termination processing a high-frequency signal are placed outside the waveguide substrate 1. Furthermore, an input pad (P1) and an electric circuit C1 are provided in a termination substrate in order to apply a low frequency signal or a DC bias voltage to a signal electrode (E1 to E4). Though FIG. 3 shows a simplified electric circuit (TM1) for the termination process and a simplified electric circuit (C1) for applying a DC bias voltage or the like, an electric circuit where resistors and capacitors are combined is provided as in Patent Document 1.

In the case where the optical waveguide has such a shape where two or more Mach-Zehnder type optical waveguides are integrated as shown in FIG. 4(c), the number of control electrodes for controlling the light waves that propagate through the optical waveguide increases, and in addition, the number of external substrates, such as termination substrates, becomes larger. It is particularly preferable to apply the structure of the present invention to such an optical waveguide element.

The present invention is characterized in that relay electrode pads (CP1, CP2) are formed on the waveguide substrate 1 or on an external substrate, such as a termination substrate, provided outside the waveguide substrate 1. In FIG. 3, one relay electrode pad of which the size makes bonding wiring possible is provided in a corner of the ground electrode pattern on the termination substrate (21 to 24). Though one relay electrode pad on which bonding wiring is possible is provided to all of the four termination substrates in FIG. 3, a bonding wire may pass through a pad provided on another termination resistor substrate so that the length of each bonding wire becomes effectively short, taking advantage of complete electrical isolation. It is preferable to set the length of the respective bonding wires to 10 mm or less, and it is more preferable to set it to 8 mm or less.

The relay electrode pads are completely electrically isolated from the control electrodes and the electric circuits wired on each substrate. In addition, the locations and the numbers of the formed relay electrode pads may be at any location and be of any number as long as the original high-frequency properties of the substrates are not lost. In many cases, ground electrodes are formed on the waveguide substrate and the external substrates, and therefore, it is preferable for a relay electrode pad to be formed in a location separated from other electric circuits by means of a ground electrode pattern. Naturally, a relay electrode pad may be provided in a portion other than in the region of a ground electrode as long as the high-frequency properties are not affected. It is preferable for the relay electrode pads to be formed at the same time as other wire patterns in order to simplify the manufacturing process for the parts.

It is desirable for the size of the relay electrode pads to be approximately 0.2×0.2 mm$^2$ to 1×1 mm$^2$ because bonding wiring is possible and an appropriate bonding strength can be gained. In addition, it is desirable for a relay electrode pad and a signal electrode to be away from each other by a distance two or more times greater than the width of the signal electrode or for a ground electrode to be provided in between in order to prevent electric signal crosstalk.

Relay electrode pads can be provided to all of the external substrates provided within the housing so that relay points for bonding wires can be freely selected. As a result, it is possible to shorten the length of the bonding wires in a balanced manner. Thus, bonding wires can be prevented from disengaging or disconnecting due to vibrations or an impact, which makes it possible to provide an optical waveguide element module having high reliability. In addition, the relay electrode pads are formed on the existing waveguide substrate and external substrates, and therefore, it is also possible to minimize an increase in the size of the parts and the number of parts, and thus, an optical waveguide element module that can be reduced in size and where an increase in the manufacturing costs can be minimized can be provided.

It is preferable for the bonding wires that pass through a relay electrode pad to be wires for supplying a low frequency signal or a DC signal to a control electrode. In general, the length of the entire wire changes when passing through a relay electrode pad. In the case where a bonding wire for transmitting a high-frequency signal is disposed via a relay electrode pad, the length of the entire wire varies, which causes the phase in which a high-frequency signal is applied to a control electrode to change and makes it easy for the reflection of the signal from the connection portion of the relay electrode pad to take place, and this causes various properties of the optical waveguide element, such as the modulation properties of the optical modulator, to deteriorate.

Therefore, in the case of an optical waveguide element provided with a Mach-Zehnder type optical waveguide (MZ) as in FIGS. 4(a) to 4(c), it is preferable for at least one external substrate to be a termination substrate where the wire circuit on the termination substrate is provided with a circuit for supplying a low frequency signal for bias control or a DC signal of a bias voltage to the control electrode and the wire for supplying the low frequency signal or the DC signal to be formed of a bonding wire via a relay electrode pad provided on the waveguide substrate or on another external substrate.

Though the above-described external substrates are mainly termination substrates, the external substrates may be relay substrates for supplying a high-frequency signal to a control electrode. In such a case, they are designed to have phase matching so that no electrical reflection occurs. Thus, according to the present invention, external substrates that are used in existing optical waveguide element modules can be used, and therefore, it becomes possible to provide an optical waveguide element module having high reliability without an increase in the number of parts.

Figure 5:
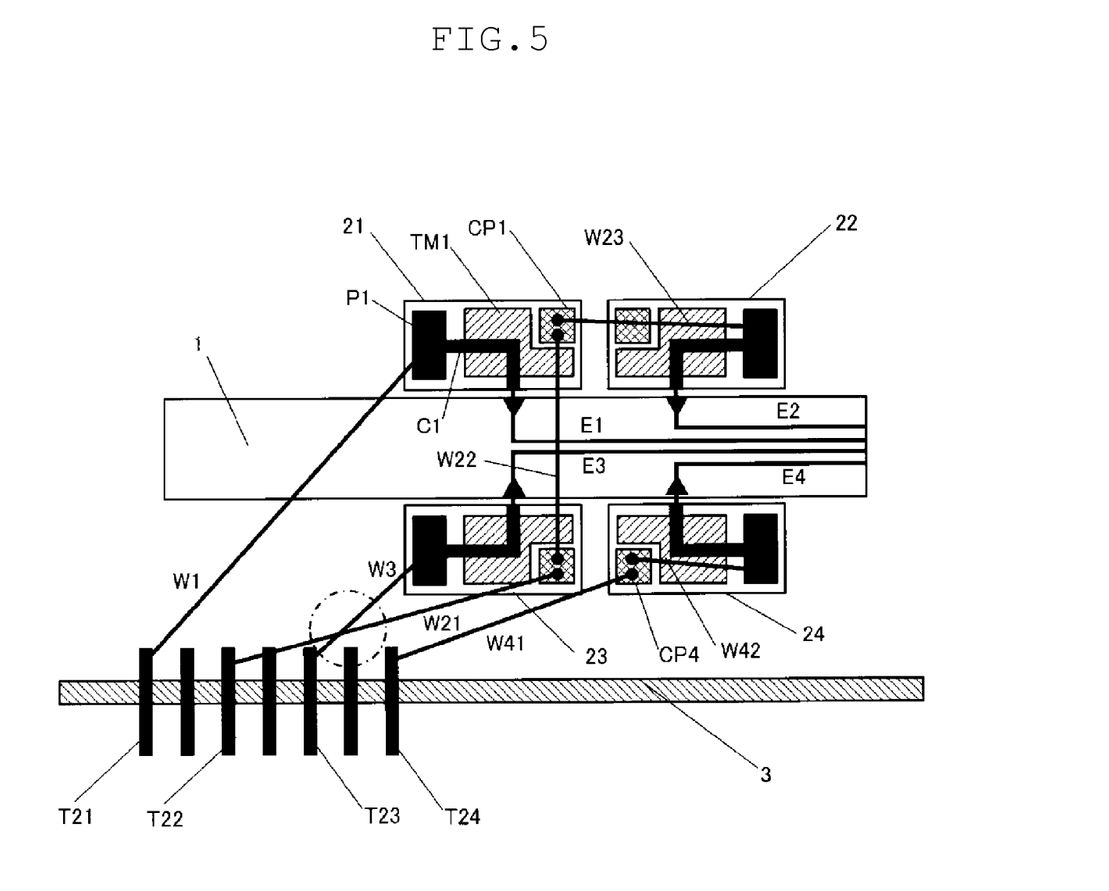
FIG. 5 is a diagram for illustrating an example where bonding wires cross in an optical waveguide element module according to the present invention.

In the case where the termination substrates (21 to 24) and the connection terminals (T21 to T24) are located in close proximity to each other as shown in FIG. 5, some bonding wires cross as shown by the one-dotted chain circle, and in some circumstances, they may make contact with each other. In the case where the bonding wires have insulating coating, mutual contact naturally does not generate an electrical connection. In the case where there is a possibility that the coating of the bonding wires may come off due to repetitive vibrations and impacts, which may cause electrical connection, or there is a possibility that physical disconnection may occur, it is preferable to secure the wiring route that prevents the bonding wires from crossing or making contact by appropriately selecting relay points for the bonding wires as shown in FIG. 3.

Figure 6:
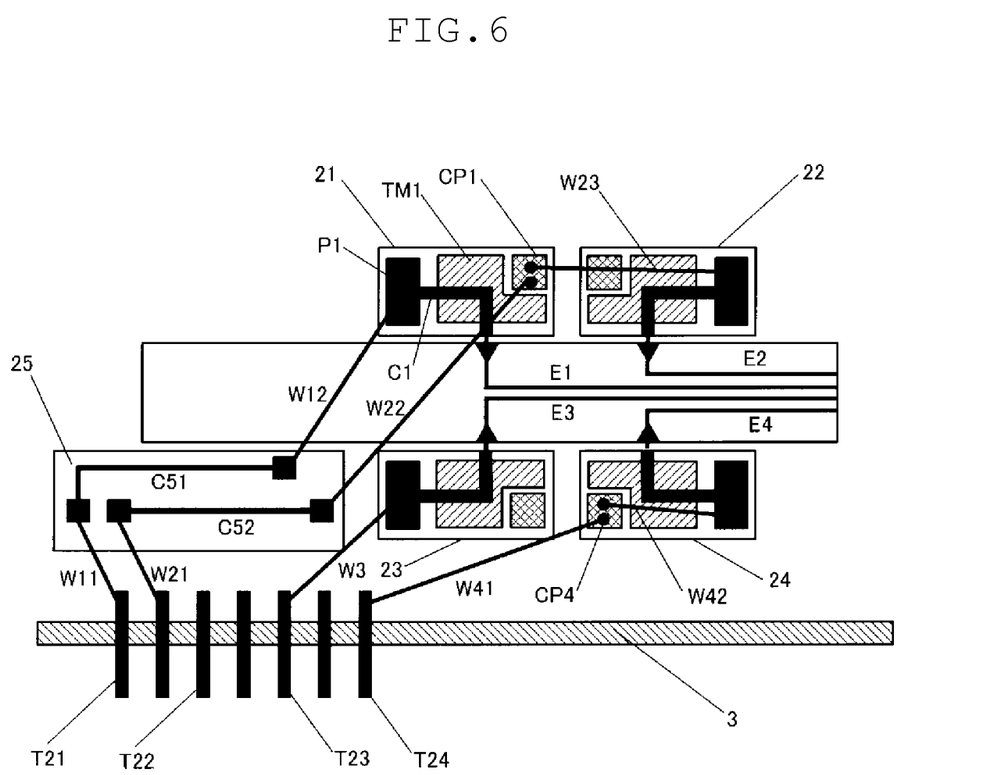
FIG. 6 is a diagram for illustrating an example where a relay substrate is used in an optical waveguide element module according to the present invention.

Furthermore, in the case where it is necessary to shorten the length of the bonding wires as shown in FIG. 6, a relay electrode pad may be provided on the existing relay substrate provided in addition to the termination substrates (21 to 24), or a new relay substrate 25 provided with wires for relay (C51, C52) may be provided. Here, it is preferable for the size of the new relay substrate 25 to be set to the size for effectively using the space where the existing external substrates are not placed.

Figure 7:
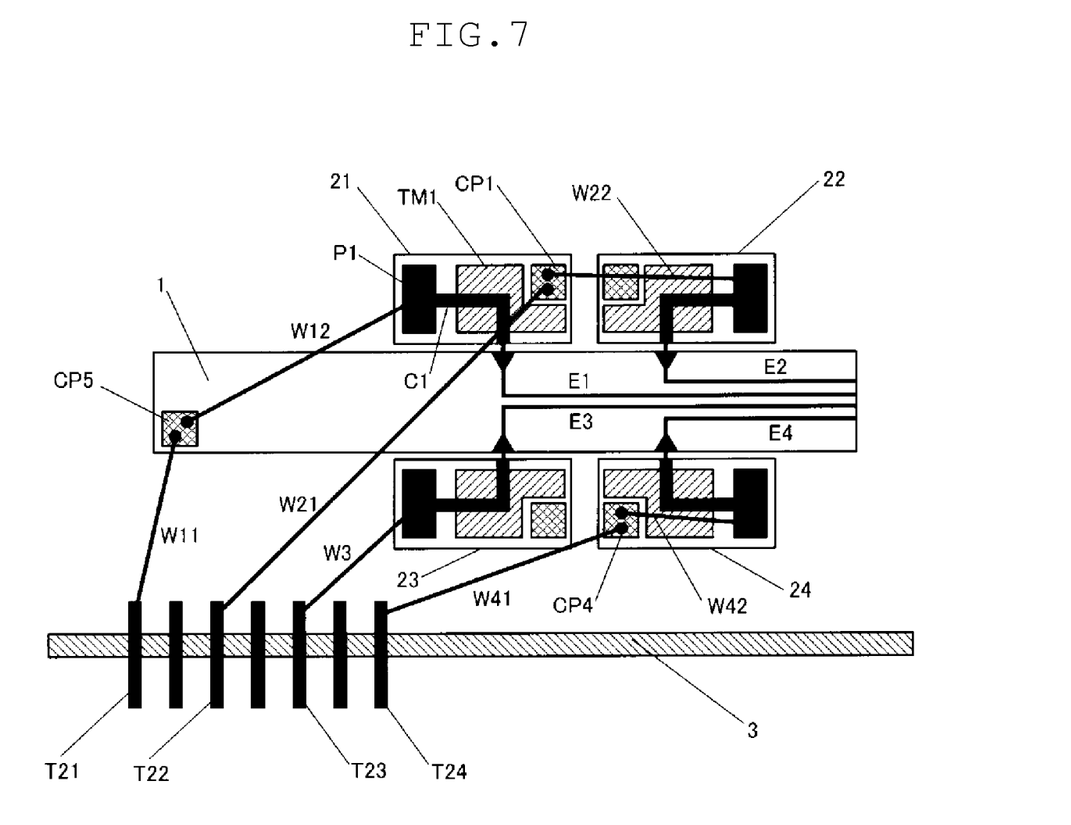
FIG. 7 is a diagram for illustrating an example where a relay electrode pad is provided on the waveguide substrate in an optical waveguide element module according to the present invention.

FIG. 7 is an example of the application of the optical waveguide element module shown in FIG. 3 and is a diagram for illustrating an example where a relay electrode pad (CP5) is provided on a waveguide substrate 1. An input pad P1 connected to a wire circuit TM1 and a terminal T21 are connected via bonding wires (W11, W12) passing through a relay electrode pad CP5.

INDUSTRIAL APPLICABILITY

As described above, the present invention makes it possible to provide an optical waveguide element module that can prevent the bonding wires from disengaging or disconnected and has high reliability. Furthermore, it is possible to provide an optical waveguide element module that can be reduced in size and where an increase in the manufacturing costs can be minimized.

EXPLANATION OF SYMBOLS

1 Waveguide substrate
2, 21 to 25 External substrates
3 Housing
E, E1 to E4 Control electrodes (signal electrodes)
C, C1 Electric circuits
W, W1 to W42 Bonding wires
O1, O2 Optical fibers for input/output
CP1, CP4 Relay electrode pads
T1 to T24 Connection terminals
TM1 Termination resistor circuit

The invention claimed is:
1. An optical waveguide element module, comprising:
a waveguide substrate on which an optical waveguide and control electrodes for controlling light waves that propagate through the optical waveguide are formed;
an external substrate having a wire circuit, said wire circuit being connected to a control electrode electrically, disposed in proximity to the waveguide substrate;
a housing in which the external substrate and the waveguide substrate are arranged; and
a terminal which is connected to an external electrical circuit for supplying electrical signals to the control electrode or deriving electrical signals from the control electrode provided with the housing, wherein
a relay electrode pad which is electrically isolated from both of the wiring circuit and the control electrode and is used only for relaying a bonding wire, is formed in any portion of at least one of the waveguide substrate and the external substrate, and
at least one bonding wire is connected from a control electrode to the terminal or from the wire circuit to the terminal via the relay electrode pad.
2. The optical waveguide element module according to claim 1, wherein the bonding wire connected via the relay electrode pad is a wire for supplying a low frequency signal or a DC signal to the control electrode.
3. The optical waveguide element module according to claim 1, wherein the external substrate is a relay substrate for supplying a high-frequency signal to a control electrode, or a termination substrate for terminating a high-frequency signal derived from a control electrode.

4. The optical waveguide element module according to claim 1, wherein the optical waveguide is provided with at least two or more integrated Mach-Zehnder type optical waveguides.

5. The optical waveguide element module according to claim 2, wherein
the external substrate is a termination substrate,
a wire circuit of the termination substrate is provided with a circuit for supplying a low frequency signal for bias control, or a DC signal of a bias voltage, to the control electrode, and
a wire for supplying the low frequency signal or the DC signal is a bonding wire connected via the relay electrode pad which is provided on the waveguide substrate or on another external substrate.

6. The optical waveguide element module according to claim 2, wherein the external substrate is a relay substrate for supplying a high-frequency signal to a control electrode, or a termination substrate for terminating a high-frequency signal derived from a control electrode.

7. The optical waveguide element module according to claim 2, wherein the optical waveguide is provided with at least two or more integrated Mach-Zehnder type optical waveguides.

8. The optical waveguide element module according to claim 3, wherein the optical waveguide is provided with at least two or more integrated Mach-Zehnder type optical waveguides.

9. The optical waveguide element module according to claim 5, wherein the optical waveguide is provided with at least two or more integrated Mach-Zehnder type optical waveguides.

10. The optical waveguide element module according to claim 6, wherein the optical waveguide is provided with at least two or more integrated Mach-Zehnder type optical waveguides.

\* \* \* \* \*